D. WEBSTER.
EGG BEATER.
72136
PATENTED
DEC 10 1867
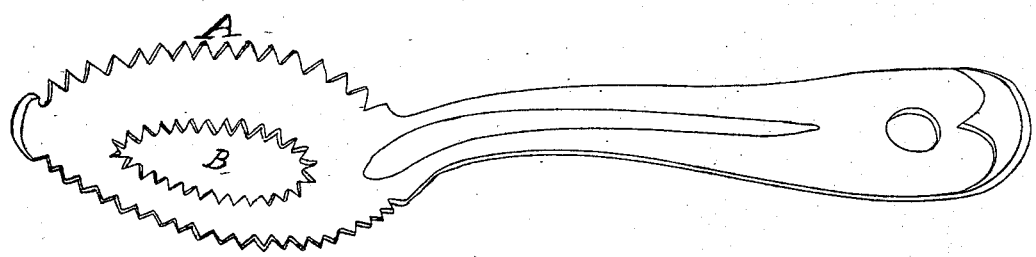
Witnesses.
C. H. Wright
H. R. Irwin
Inventor.
Dudley Webster

United States Patent Office.

DUDLEY WEBSTER, OF WASHINGTON, DISTRICT OF COLUMBIA.

*Letters Patent No. 72,136, dated December 10, 1867.*

IMPROVED EGG-BEATER.

*The Schedule referred to in these Letters Patent and making part of the same.*

TO ALL WHOM IT MAY CONCERN:

Be it known that I, DUDLEY WEBSTER, of the city and county of Washington, in the District of Columbia, have invented an Improvement in a Spoon or Spoon-Shaped Utensil for Beating Eggs and other like purposes, to be made of tin, iron, or any other suitable material; and do declare that the following is a description thereof, according to the accompanying drawings, wherein the device in question is shown in perspective.

It is designed to be made in the form shown, but like forms can be used without deviating from the end I have in view.

It has been customary to use a device for the purpose designed, such as a common spoon, or one made of wire, also another, more complicated, made of wire and turned by a crank, with other varieties, none of which, I believe, will accomplish so easily the purposes which are proposed as the one I have invented.

My device, moreover, is very simple in its construction, and requires but little time in its manufacture, and can be afforded at a less cost than other devices now used for like purposes. The detail of its construction will be readily understood by the drawings, which, it will be seen, is spoon-shaped. The outer edges, as shown by A, are serrated, or this form may be so varied as to have only one side serrated. In the body or bowl of the device is an aperture, of a small spoon-size, as shown by B, and the edges of that are likewise serrated, giving it more surface. Its operation or the manner of its use will be readily seen.

What I claim, and desire to secure by Letters Patent, is—

As a new article of manufacture, an egg-beater spoon, constructed as described; viz, with its circumference and the edges of an inner central opening serrated, as and for the purpose described.

DUDLEY WEBSTER.

Witnesses:
    D. H. STEARNS,
    J. W. BARNACLO.